United States Patent [19]

Rodriquez et al.

[11] Patent Number: 5,499,587
[45] Date of Patent: Mar. 19, 1996

[54] SULFUR-SORBENT PROMOTER FOR USE IN A PROCESS FOR THE IN-SITU PRODUCTION OF A SORBENT-OXIDE AEROSOL USED FOR REMOVING EFFLUENTS FROM A GASEOUS COMBUSTION STREAM

[75] Inventors: Domingo Rodriquez, Edo Miranda, Venezuela; Roy Payne, Mission Viejo, Calif.; Cebers Gomez; Jose Carrazza, both of Miranda, Venezuela; John Kramlich, Irvine, Calif.

[73] Assignee: Intevep, S.A., Caracas, Venezuela

[21] Appl. No.: 657,103

[22] Filed: Feb. 19, 1991

Related U.S. Application Data

[63] Continuation-in-part of Ser. No. 498,952, Mar. 26, 1990, which is a continuation-in-part of Ser. No. 263,896, Oct. 28, 1988, Pat. No. 4,923,483, which is a division of Ser. No. 96,643, Sep. 11, 1987, Pat. No. 4,795,478, which is a continuation-in-part of Ser. No. 14,871, Feb. 17, 1987, Pat. No. 4,834,775, which is a continuation-in-part of Ser. No. 875,450, Jun. 17, 1986, Pat. No. 4,801,304, which is a continuation-in-part of Ser. No. 342,148, Apr. 24, 1989, Pat. No. 4,976,745, which is a continuation-in-part of Ser. No. 133,323, Dec. 16, 1987, Pat. No. 4,824,439, which is a continuation-in-part of Ser. No. 14,871, Feb. 17, 1987, Pat. No. 4,834,775.

[51] Int. Cl.[6] .................................. F23B 7/00; F23J 7/00
[52] U.S. Cl. .............................. 110/342; 110/345; 431/4; 44/280; 44/301
[58] Field of Search .......................... 44/301, 280, 457; 110/342, 345; 423/243, 244 R, 244 A; 431/2, 4

[56] References Cited

U.S. PATENT DOCUMENTS

| | | |
|---|---|---|
| 3,746,498 | 7/1973 | Stengel ........................... 431/4 |
| 3,873,670 | 3/1975 | Dugan et al. ................. 423/244 A |
| 3,980,449 | 9/1976 | Zetlmeisl et al. ................. 44/68 |
| 4,116,610 | 9/1978 | Berthiaume ................... 44/301 |
| 4,187,282 | 2/1980 | Matsuda et al. ............... 423/244 R |
| 4,191,115 | 3/1980 | Yang et al. .................. 423/244 A |
| 4,375,359 | 3/1983 | Chapman et al. ............... 431/2 |
| 4,427,362 | 1/1984 | Dykema ........................ 431/4 |
| 4,447,203 | 5/1984 | Hampton et al. ............... 431/4 |
| 4,503,785 | 3/1985 | Scocca ....................... 44/458 |
| 4,512,774 | 4/1985 | Myers .......................... 44/51 |
| 4,542,704 | 9/1985 | Brown et al. ................. 110/345 |
| 4,555,390 | 11/1985 | Bhatia .................... 423/244 A |
| 4,600,569 | 7/1986 | Yoon ........................ 423/243 |
| 4,615,871 | 10/1986 | Yoon ........................ 423/243 |
| 4,626,418 | 12/1986 | College et al. ............. 423/244 A |
| 4,642,225 | 10/1987 | Leikert .................... 423/244 A |
| 4,726,940 | 2/1988 | Kobayashi ................. 423/244 A |
| 4,749,382 | 6/1988 | Collins et al. ................ 44/53 |
| 4,822,577 | 4/1989 | Epperly et al. .............. 423/243 |
| 4,861,568 | 8/1989 | Robinson ................... 423/243 |
| 4,960,577 | 10/1990 | Torbov et al. .............. 423/244 |
| 5,006,323 | 4/1991 | Johnson ................... 423/244 A |

FOREIGN PATENT DOCUMENTS 0159291  8/1991  Japan ........................ 44/301

Primary Examiner—Margaret Medley
Attorney, Agent, or Firm—Bachman & LaPointe

[57] ABSTRACT

A process for the in-situ production of an effluent sorbent-oxide aerosol with promoter during the combustion of a hydrocarbon containing fuel whereby the effluents are removed from the resultant gaseous hydrocarbon stream comprises admixing an aqueous solution of the sorbent and promoter with the fuel, atomizing and combusting the mixture under controlled conditions so as to generate the effluent sorbent-oxide aerosol.

26 Claims, No Drawings

SULFUR-SORBENT PROMOTER FOR USE IN A PROCESS FOR THE IN-SITU PRODUCTION OF A SORBENT-OXIDE AEROSOL USED FOR REMOVING EFFLUENTS FROM A GASEOUS COMBUSTION STREAM

CROSS-REFERENCE TO RELATED APPLICATIONS

This application is a Continuation-In-Part of application Ser. No. 498,952, filed Mar. 26, 1990 now pending which is a Continuation-In-Part of application Ser. No. 263,896, filed Oct. 28, 1988, which issued on May 8, 1990 as U.S. Pat. No. 4,923,483, which is a division of application Ser. No. 096,643, filed Sep. 11, 1987, which issued on Jan. 3, 1989 as U.S. Pat. No. 4,795,478, which in turn is a Continuation-In-Part of application Ser. No. 014,871, filed Feb. 17, 1987, which issued on May 30, 1989 as U.S. Pat. No. 4,834,775, which in turn is a Continuation-In-Part of application Ser. No. 875,450, filed Jun. 17, 1986, which issued on Jan. 31, 1989 as U.S. Pat. No. 4,801,304 which application is also a Continuation-In-Part of application Ser. No. 342,148, which issued on Dec. 11, 1990 as U.S. Pat. No. 4,976,745, filed Apr. 24, 1989, which is a Continuation-In-Part of application Ser. No. 133,323, filed Dec. 16, 1987, which issued on Apr. 25, 1989 as U.S. Pat. No. 4,824,439 which in turn is a Continuation-In-Part of the aforementioned application Ser. No. 014,871, filed Feb. 17, 1987, which issued on May 30, 1989 as U.S. Pat. No. 4,834,775.

This application is related to application Ser. No. 657,442, filed concurrently herewith Feb. 19, 1991 now abandoned, 1990 and application Ser. No. 657,461 now abandoned, filed concurrently herewith Feb. 19, 1991.

BACKGROUND OF THE INVENTION

The present invention relates to a process for the in-situ production of a sorbent-oxide aerosol with promoter used for removing effluents from a gaseous combustion stream and, more particularly, a process for the production of a metal oxide sorbent with promoter which absorbs sulfur and other effluents from a hydrocarbon fuel combustion stream.

Gaseous combustion streams are the source of many undesirable effluents discharged into the environment which result in atmospheric pollution. The undesirable effluents include, for example, sulfur, nitrogen, chlorium flourine and a host of other undesirable effluents. Particularly harmful to the environment are the undesirable effluents which result from the combustion of hydrocarbon containing fossil fuels.

Heretofore, many processes have been proposed for removing effluents from combustion streams. In the case of sulfur, nitrogen and other like effluents it is common practice to scrub the gaseous streams. In addition, in-furnace dry sorbent injection has been commonly employed. Neither of these processes tend to be cost effective on a commercial level.

Naturally, it would be highly desirable to improve the process for removing effluents from industrial combustion streams as disclosed in co-pending U.S. patent application Ser. No. 498,952 pending. Co-pending U.S. patent application Ser. No. 498,952 pending discloses an improved process for removing effluents from a hydrocarbon fuel combustion stream wherein a sorbent-oxide aerosol is produced in-situ during combustion of the hydrocarbon fuel. The process is a great improvement over previously known processes.

Co-pending U.S. patent application Ser. No. 498,952 pending discloses that the generation of the sorbent oxide aerosol is achieved, in part, by dissolving an effluent sorbent compound in water, and mixing this aqueous solution with the fuel either prior or at the time of combustion. Co-pending U.S. patent application Ser. No. 498,952 pending also discloses that by optimizing parameters associated with the atomization and/or combustion of the fuel/sorbent mixture, the generation of the sorbent-oxide aerosol, and therefore the effluent absorption can be greatly enhanced.

Japanese Patents 75-26,766(1975) and 75-46,562(1975) disclose that by mixing the fuel and an aqueous solution of the effluent sorbent, higher levels of $SO_2$ removal can be achieved compared to the Dry Sorbent Injection technology. They fail to recognize, however, that by optimizing the combustion conditions the performance can be improved.

The process of the present invention represents an improvement over those previously described, since by adding small amounts of a sulfation promoter to the aqueous solution containing the sorbent compound the removal of the effluent is greatly enhanced, upon generation of the sorbent oxide aerosol.

Japanese Patent 78-39,965(1978), Japanese Patent 84-90,619 (1984), and U.S. Pat. No. 4,191,115 (1980), have disclosed that by mixing a sulfation promoter with $CaCO_3$ or CaO an enhancement in the absorption of $SO_2$ from a gas stream can be achieved. The process of the present invention represents an improvement over these processes because the sorbent-oxide aerosol with promoter is more reactive toward $SO_2$ and therfore a much higher level of $SO_2$ removal can be achieved.

Accordingly, it is a principal object of the present invention to provide a process for removing environmental harmful effluents from a gaseous stream.

It is a particular object of the present invention to provide a process for the in-situ production of a sorbent-oxide aerosol with promoter for removing effluents from a gaseous combustion stream which is effective and economical.

It is a still further object of the present invention to provide a process for the production of a sorbent-oxide stream with promoter which is useful for removing sulfur and other effluents from a gaseous hydrocarbon fuel combustion stream.

Further objects and advantages of the present invention will appear herein below.

SUMMARY OF THE INVENTION

In accordance with the present invention, the foregoing objects and advantages are readily obtained.

The present invention is drawn to a process for the production of a sorbent-oxide aerosol including a promoter which is used for removing effluents from a gaseous combustion stream. It is a particular feature of the present invention to produce a sulfur sorbent metal-oxide aerosol and promoter for removing sulfur from a gaseous hydrocarbon fuel combustion stream. The process of the present invention comprises forming an aerosol of an effluent sorbent and promoter in situ in the form of ultra-fine sorbent-oxide particles having preferably a mean diameter of less than 1.5 um during the combustion of a hydrocarbon containing fossil fuel and contacting the gaseous combustion stream containing the effluents with the aerosol so that the sorbent-oxide particles absorb the effluents from the gaseous stream. In a preferred process of the present invention, a hydrocarbon containing fuel is admixed with an aqueous solution consisting essentially of a dissolved effluent sorbent compound and promoter so as to form a combustible fuel mixture. The combustible fuel mixture is atomized under controlled conditions and fed to a combustion zone, preferably in the presence of an oxidant. Alternatively, the hydrocarbon fuel and aqueous solution of effluent sorbent compound and promoter may be fed separately to the combustion zone and be admixed therein; however, admixing prior to feeding is preferred. The combustible fuel mixture and oxidant are combusted in the combustion zone under controlled temperature conditions $T_1$ so as to obtain an aerosol of the sorbent in the form of ultra-fine sorbent-oxide particles having preferably a mean diameter of less than 1.5 um in the gaseous combustion stream. The gaseous combustion stream is thereafter cooled to a temperature $T_2$, where $T_2$ is less than $T_1$, so as to allow the sorbent-oxide particles to absorb the effluents from the combustion stream. In accordance with various embodiments of the present invention, the oxidant can be introduced at flame level or a portion of the oxidant may be introduced into the gaseous combustion stream downstream of the combustion zone in a stepwise manner which results in improved effluent absorption. In accordance with the process of the present invention, the combustion flame temperature, oxidant introduction, oxidant concentration, and atomizing conditions are controlled so as to insure the production of a sorbent-oxide particle.

DETAILED DESCRIPTION

The present invention relates to a process for removing effluents from a gaseous combustion stream and, more particularly, a process for the in-situ production of a sorbent-oxide aerosol with promoter during the combustion of a hydrocarbon whereby effluents are removed from the resultant gaseous hydrocarbon combustion stream.

The mechanism of the process of the present invention will be discussed in detail. An aqueous solution of a dissolved effluent sorbent compound and promoter is admixed with a hydrocarbon containing fossil fuel to form a combustible fuel mixture. The process is particularly useful when employing high sulfur containing fuels, that is, sulfur contents of greater than 2.5 wt. %. The amount of sorbent and promoter in the aqueous solution and the volume of aqueous solution mixed with the fossil fuel is dependent on the nature and amount of effluent bearing material which is present in the fuel. In the case of sulfur, for example, the molar ratio of sorbent to sulfur in the fuel mixture may be 0.1 to 2.5 and preferably is between about 0.6 to 1.2 depending on the particular sorbent used. The molar ratio of promoter to sorbent is between 0.001 and 0.1 and preferably between 0.001 and 0.05. In the case of nitrogen, the ratio would be substantially the same as for sulfur given above. The effluent sorbent compound is in the form of a metal salt selected from the group consisting of alkaline, alkaline earth [or other metal salts wherein the metals have the same or higher valence than the alkaline earth metals.] Preferred metals are Ca and Mg with Ca being the ideal. Particularly suitable calcium metal salt compounds are $CaCl_2$, $Ca(NO_3)_2$, $Ca(CH_3COO)_2$, $Ca(C_2H_5COO)_2$, $Ca(CHOO)_2$, $Ca(OH)_2$, $CaO$ and mixtures thereof. Similar magnesium compounds may be employed. The addition of solubility enhancing compounds to the water that raise the solubility of the metal salt, such as sucrose, glycerol, alcohols, and the like improves the performance of the process. In the case of water insoluable metal salt compounds such as $Ca(OH)_2$ and CaO solubility enhancing compounds are required to dissolve the salts in order to form the aqueous solution. The solubility enhancing compound is employed in an amount sufficient to take all of the metal salt into aqueous solution.

In accordance with the present invention, the promoter compound is likewise in the form of a metal salt (any other forms). Suitable promoters include salts of Fe, Cu, Mm, B, Al, Na, K, P, V, Zn, Ni and mixtures thereof. Preferred promoters are salts of Fe, Cu, Mn, B and mixtures thereof. Ideal promoters are salts of Fe, Cu and mixtures thereof.

The fuel mixture as described above is fed to a nozzle where the fuel is atomized under controlled conditions with or without an atomizing gas, preferably with an atomizing gas. Suitable atomizing gases include air, steam, $N_2$, $O_2$, Ar, He, with air, steam, $N_2$ being preferred. Atomization, as demonstrated in co-pending U.S. patent application Ser. No. 498,952, tends to have a strong effect on the particle size of the resultant sorbent-oxide produced and, ultimately, the degree of effluent absorption. During fuel atomization, the fuel mixture is transformed into small droplets. By controlling atomizing conditions, droplet size is controlled which, it has been found, controls the particle size of the sorbent-oxide ultimately produced in the process of the present invention. As noted above, it is preferred to atomize the fuel mixture with an atomizing gas. The mass ratio of gas to fuel mixture should be greater than or equal to 0.05 preferably greater than or equal to 0.10 and ideally between about 0.15 and 3.00 in order to obtain the desired sorbent oxide particle size as set forth hereinbelow and demonstrated by the examples enclosed in U.S. patent application Ser. No. 498, 952.

The atomized fuel mixture is thereafter combusted in a combustion zone in the presence of an oxidant under controlled conditions. During combustion, it is believed that small solid crystals of the sorbent are formed after evaporation of the water. These crystals then decompose at the combustion flame temperature $T_1$ and ultra-fine particles of sorbent-oxide are generated in the gaseous combustion stream. The combustion temperature $T_1$, namely the adiabatic flame temperature may be controlled in order to achieve the desired combustion of the fuel and formation of the sorbent. At elevated flame temperatures there is a tendency for a coalescense effect which has an adverse effect on the sorbent-oxide particle size. At the same time, the temperature must be sufficiently high to obtain sufficient fuel utilization and sorbent generation. In order to effectively carry out the process of the present invention, the combustion temperature $T_1$ is between about 1525° K to 2450° K, preferably 1900° K to 2200° K.

In order to obtain effective combustion, the oxidant must be present in an amount at least equal to the stoichiometric amount with respect to the fuel and preferably in an amount greater than the stoichiometric amount and up to 1.1 times the stoichiometric amount. It has been found that the process of the present invention may be improved by feeding the oxidant in a stepwise manner, that is, a portion to the combustion zone, i.e. flame, and a portion downstream of the combustion zone at a desired temperature. The oxidant is fed to the combustion zone and downstream thereof, with respect to total oxidant employed, of between about 60% to 95% and 5% to 40%, respectively, preferably 80% to 90% and 10% to 20%, respectively. The oxidant introduced downstream of the combustion zone should be introduced at a temperature of between about 1525° K to 2200° K, preferably 1525° K to 1600° K in order to obtain best results with respect to complete combustion of the fuel and formation of the sorbent to obtain the desired sorbent-oxide particles.

The resultant aerosol from the combustion of the atomized fuel mixture, that is the sorbent-oxide particles carried in the gaseous hydrocarbon combustion stream, is characterized by an ultra-fine sorbent-oxide particle having preferably a mean diameter of less than 1.5 um size and ideally less than 1.0 um. The combustion stream is cooled in a controlled manner through a desired temperature range $T_2$ in order to allow the sorbent-oxide particles to react with and absorb the effluent from the combustion stream. The temperature range $T_2$ is between about 1500° K to 700° K, preferably 1500° K to 1150° K. The gaseous combustion stream should remain within the temperature range $T_2$ for a period of greater than 0.10 seconds and preferably greater than 0.50 seconds in order to insure effective sorbent utilization and effluent capture. It is preferred that sorbent utilization be greater than or equal to about 35%, ideally 50%. This is the range chosen for the unpromoted. For the promoted case levels of above 45%, and ideally above 70%, could be used if higher numbers are required. Sorbent utilization is defined as follows:

$$\% \text{ sorbent utilized} = 100 \times \frac{\left(\frac{[\text{effluent}]\text{baseline} - [\text{effluent}]\text{sorbent}}{[\text{effluent}]\text{baseline}}\right)}{\frac{1}{\alpha} \frac{\text{moles sorbent}}{\text{moles effluent}}}$$

where $\alpha$ is the stoichiometric coefficient in the sorbent and effluent chemical reaction and [effluent]baseline is the concentration of effluent in the dry emission gases in the absence of a sorbent.

The following examples illustrate specific features of the process of the present invention but in no way are intended to be limiting.

EXAMPLE I

In order to demonstrate and quantify the existance of unwanted effluents, namely sulfur, in a hydrocarbon fuel combustion stream, a bitumen with a sulfur content of 3.87% by weight and a heating value of 17,000 BTU/lb. was combusted in a furnace. The bitumen was fed to the furnace through a commercially available nozzle and was atomized with air in a mass ratio of air to fuel of 2.0. The bitumen was combusted at a firing rate of 56000 BTU/lb. until completely combusted. The concentration of $SO_2$ in the dry emission gases was then measured. By dry emission gases is meant all the gases produced during the combustion process, with the exception of $H_{2O}$, corrected to zero percent oxygen. The concentration of $SO_2$ was found to be 2700 ppm.

EXAMPLE II

In order to demonstrate the effectiveness of the process of U.S. patent application Ser. No. 498,952 of which the process of the instant application is an improvement over, another run similar to that described above was conducted with the exception that a mixture was prepared and combusted comprising 55% by volume of bitumen and 45% by volume of an aqueous solution containing 14% by weight calcium formate. The resulting fuel mixture had a molar ratio of Ca to S of 0.6. The fuel mixture was atomized and combusted under the same condition set forth above in Example I. The $SO_2$ concentration in the dry gas was measured and was found to be 1906 PPM which is equal to a 49% sorbent utilization, based on the equation previously described. This represents a significant improvement when compared to Example I where no sulfur sorbent compound was admixed with the bitumen.

EXAMPLE III

A series of runs were conducted in order to determine the effect of various promoters on the sulfur capturing effect of sulfur sorbent compounds. All of the runs were condcuted under the same conditions as set forth above with reference to Example II with the following exceptions. In Run I iron gluconate ($FeC_{12}O_{14}H_{22}$) was added as a promoter to the aqueous calcium formate solution in an amount so as to produce a molar ratio of Fe to Ca of 0.05. In Runs 2 through 9 the following promoters were added to the calcium formate aqueous solution in an amount to obtain a molar ratio of promoter to Ca of 0.05. Run 2—copper acetate [$Cu(CH_3COO)_2$]. Run 3—manganese acetate [$Mn(CH_3COO)_2$]. Run 4—boron oxide ($B_2O_3$). Run 5—aluminum sulfate [$Al_2(SO_4)_3$]. Run 6—sodium formate [Na(COOH)]. Run 7—phosphoric acid [$H_3PO_4$]. Run 8—zinc acetate [$Zm_{32}$]. Run 9—nickel acetate [$N:(CH_3COOH)_2$]. Run 10—vanadium oxysulfate [$VOSO_4$]. The measure $SO_2$ concentrations for all nine runs are summarized below in Table I and compared to Examples I and II so as can be seen from Table I while all of the additive use as promoters had a positive effect on the sulfur-sorbent comound, clearly Fe, Cu, Mn, and B had the greatest effect.

TABLE I

| FUEL | ADDITIVE | FLUE GAS $SO_2$ CONCENTRATION, PPM | % SORBENT UTILIZATION |
|---|---|---|---|
| BITUMEN | NONE | 2700 | — |
| BITUMEN | CALCIUM FORMATE | 1906 | 49 |
| BITUMEN | CALCIUM FORMATE + IRON GLUCONATE | 1436 | 78 |
| BITUMEN | CALCIUM FORMATE + COPPER ACETATE | 1436 | 78 |
| BITUMEN | CALCIUM FORMATE + MANGANESE ACETATE | 1436 | 78 |
| BITUMEN | CALCIUM FORMATE + BORON OXIDE | 1582 | 69 |
| BITUMEN | CALCIUM FORMATE + ALUMINUM SULFATE | 1728 | 60 |
| BITUMEN | CALCIUM FORMATE + SODIUM FORMATE | 1760 | 58 |
| BITUMEN | CALCIUM FORMATE + PHOSPHORIC ACID | 1744 | 59 |
| BITUMEN | CALCIUM FORMATE + ZINC ACETATE | 1792 | 56 |
| BITUMEN | CALCIUM FORMATE + Ni ACETATE | 1825 | 54 |
| BITUMEN | CALCIUM FORMATE + VANADIUM OXYSULFATE | 1809 | 55 |

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A process for the in-situ production of an effluent sorbent-oxide aerosol during the combustion of a hydrocarbon containing fuel whereby effluents are removed from the resultant gaseous hydrocarbon combustion stream comprising: (1) forming an aqueous solution comprising an effluent sorbent compound selected from the group consisting of $CaCl_2$, $Ca(NO_3)_2$, $Ca(CH_3COO)_2$, $Ca(C_2H_5COOH)_2$, $Ca(CHOO)_2$, $Ca(OH)_2$, CaO and mixtures thereof and a promoter selected from the group consisting of salts of Fe, Cu, Mn, B, Al, Na, K, P, V, Zn, Ni and mixtures thereof dissolved in water; (2) admixing the aqueous solution of the effluent sorbent compound and promoter with a hydrocarbon containing fuel so as to form a combustible fuel mixture; (3) atomizing said combustible fuel mixture and feeding said atomized fuel to a combustion zone; (4) combusting said atomized fuel mixture in said combustion zone under controlled temperature conditions $T_1$ wherein $T_1$ is between about 1525° K to about 2450° K in the presence of an oxygen containing oxidant so as to obtain a sorbent-oxide aerosol with promoter comprising ultra-fine calcium sorbent-oxide particles having a mean diameter of less than 1.5 um in said gaseous combustion stream; and (5) cooling said gaseous combustion stream to a temperature $T_2$ wherein $T_2$ is between about 700° K to about 1500° K so that said calcium sorbent-oxide particles absorb said effluents from said gaseous combustion stream.

2. A process according to claim 1 wherein said temperature $T_1$ is between about 1900° K to about 2200° K.

3. A process according to claim 2 wherein said temperature $T_2$ is between about 1000° K to about 1500° K.

4. A process according to claim 3 wherein said sorbent oxide particles have a mean diameter of about $\leq 1.0$ um.

5. A process according to claim 1 wherein said temperature $T_2$ is between about 1000° K to about 1500° K.

6. A process according to claim 1 wherein said sorbent-oxide particles have a mean diameter of about $\leq 1.0$ um.

7. A process according to claim 1 wherein said fuel mixture is atomized by an atomizing fluid.

8. A process according to claim 1 wherein said hydrocarbon fuel contains sulfur which upon combustion forms a sulfurous by-product effluent in the form of $SO_x$.

9. A process according to claim 8 wherein said fuel mixture has a Ca to S ratio of up to 2.5.

10. A process according to claim 9 wherein at least 35% by weight of said sorbent is utilized in sulfur absorptions so as to obtain a sulfur reduction in the amount of at least 21% when compared to sorbent-free combustion processes.

11. A process according to claim 10 wherein said sorbent utilization is greater than 50%.

12. A process according to claim 8 wherein said fuel mixture has a Ca to S ratio of between about 0.6 to 1.2.

13. A process according to claim 1 further including the step of feeding additional oxidant to said gaseous stream downstream of said combustion zone.

14. A process according to claim 13 wherein said combustion zone is fed with between about 60 to 95% of total oxidant and said gaseous stream downstream of said combustion zone is fed with between about 5 to 40% of total oxidant.

15. A process according to claim 13 wherein said combustion zone is fed with between about 80 to 90% of total oxidant and said gaseous stream downstream of said combustion zone is fed with between about 10 to 20% of total oxidant.

16. A process according to claim 13 wherein said oxidant is fed to said combustion zone and to said gaseous stream in a total amount greater than the stoichiometric ratio with said hydrocarbon fuel.

17. A process according to claim 16 wherein said combustion zone is fed with between about 60 to 95% of total oxidant and said gaseous stream downstream of said combustion zone is fed with between about 5 to 40% of total oxidant.

18. A process according to claim 1 wherein said oxidant is fed to said combustion zone in at least the stoichiometric ratio with respect to said hydrocarbon fuel.

19. A process according to claim 1 further including admixing a sorbent solubility enhancing compound in said aqueous solution forming step.

20. A process according to claim 19 wherein said effluent sorbent compound is selected from the group consisting of $Ca(OH)_2$, CaO and mixtures thereof.

21. A process according to claim 19 wherein said sorbent solubility enhancing compound is selected from the group consisting of sucrose, glycerol, alcohols and mixtures thereof.

22. A process according to claim 1 wherein said promoter is selected from the group consisting of salts of Fe, Cu, Mn, B and mixtures thereof.

23. A process according to claim 1 wherein said promoter is selected from the group consisting of salts of Fe, Cu and mixtures thereof.

24. A process according to claim 1 wherein the molar ratio of sorbent to effluent is between about 0.6 to 1.2.

25. A process according to claim 24 wherein the molar ratio of promoter to sorbent is between 0,001 to 0.1.

26. A process for the in-situ production of an effluent sorbent-oxide aerosol during the combustion of a hydrocarbon containing fuel whereby effluents are removed from the resultant gaseous hydrocarbon combustion stream comprising: (1) providing a hydrocarbon containing fuel; (2) forming an aqueous solution comprising an effluent sorbent compound selected from the group consisting of $CaCl_2$, $Ca(NO_3)_2$, $Ca(CH_3COO)_2$, $Ca(C_2H_5COOH)_2$, $Ca(CHOO)_2$, $Ca(OH)_2$, CaO and mixtures thereof and a promoter selected from the group consisting of salts of Fe, Cu, Mn, B, Al, Na, K, P, V, Zn, Ni and mixtures thereof dissolved in water; (3) separately feeding and atomizing said hydrocarbon fuel and aqueous solution to a combustion zone wherein said fuel and solution are admixed; (4) combusting said fuel mixture in said combustion zone under controlled temperature conditions $T_1$ wherein $T_1$ is between about 1525° K to about 2450° K in the presence of an oxygen containing oxidant so as to obtain a calcium sorbent-oxide aerosol with promoter comprising ultra-fine sorbent-oxide particles having a mean diameter of less than 1.5 um in said gaseous combustion stream; and (5) cooling said gaseous combustion stream to a temperature $T_2$ wherein $T_2$ is between about 700° K to about 1500° K so that said calcium sorbent-oxide particles absorb said effluents from said gaseous combustion stream.

* * * * *